US010839794B2

(12) United States Patent
Li

(10) Patent No.: US 10,839,794 B2
(45) Date of Patent: Nov. 17, 2020

(54) METHOD AND APPARATUS FOR CORRECTING INPUT SPEECH BASED ON ARTIFICIAL INTELLIGENCE, AND STORAGE MEDIUM

(71) Applicant: BAIDU ONLINE NETWORK TECHNOLOGY (BEIJING) CO., LTD., Beijing (CN)

(72) Inventor: Kuai Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 134 days.

(21) Appl. No.: 16/056,673

(22) Filed: Aug. 7, 2018

(65) Prior Publication Data

US 2019/0103097 A1    Apr. 4, 2019

(30) Foreign Application Priority Data

Sep. 29, 2017   (CN) .......................... 2017 1 0909466

(51) Int. Cl.
*G10L 15/00* (2013.01)
*G10L 15/197* (2013.01)
(Continued)

(52) U.S. Cl.
CPC .......... *G10L 15/197* (2013.01); *G06F 40/232* (2020.01); *G06F 40/44* (2020.01);
(Continued)

(58) Field of Classification Search
CPC ....................................................... G10L 15/00
(Continued)

(56) References Cited

U.S. PATENT DOCUMENTS 5,457,768 A * 10/1995 Tsuboi ................... G10L 15/18
704/219
5,799,276 A *  8/1998 Komissarchik ......... G10L 15/04
704/207
(Continued)

FOREIGN PATENT DOCUMENTS

CN        103366741 A        10/2013
CN        103645876 A         3/2014
(Continued)

OTHER PUBLICATIONS

SIPO, First Office Action for CN201710909466.7, dated Jun. 22, 2020.

Primary Examiner — Michael Colucci
(74) Attorney, Agent, or Firm — Hodgson Russ LLP

(57) ABSTRACT

The present disclosure provides a method and an apparatus for correcting an input speech based on artificial intelligence. The method includes: receiving a speech input by a user; performing recognition on the speech to obtain a current recognition text; obtaining at least one candidate phrase of a first phrase to be corrected in the current recognition text and displaying the at least one candidate phrase to the user; detecting a select operation of the user, the select operation being configured to select one of the at least one candidate phrase as a target candidate phrase; and correcting the first phrase in the current recognition text by using the target candidate phrase, to obtain a target recognition text.

15 Claims, 12 Drawing Sheets

(51) Int. Cl.
*G10L 15/04* (2013.01)
*G10L 15/22* (2006.01)
*G06F 40/44* (2020.01)
*G06F 40/45* (2020.01)
*G06F 40/53* (2020.01)
*G06F 40/232* (2020.01)

(52) U.S. Cl.
CPC ............. *G06F 40/45* (2020.01); *G06F 40/53* (2020.01); *G10L 15/04* (2013.01); *G10L 15/22* (2013.01)

(58) Field of Classification Search
USPC ... 704/235, 9, 275, 270, 260, 252, 251, 257; 706/59; 717/124
See application file for complete search history.

(56) References Cited

U.S. PATENT DOCUMENTS

| | | | | |
|---|---|---|---|---|
| 6,138,098 A * | 10/2000 | Shieber | ................ | G06F 40/211 704/257 |
| 6,823,307 B1 * | 11/2004 | Steinbiss | ............... | G10L 15/197 704/251 |
| 7,286,987 B2 * | 10/2007 | Roy | ........................ | G10L 15/08 704/270 |
| 7,653,545 B1 * | 1/2010 | Starkie | ................ | H04M 3/493 704/275 |
| 7,930,168 B2 * | 4/2011 | Weng | ................... | G10L 15/1822 704/9 |
| 8,682,660 B1 * | 3/2014 | Lyudovyk | ............. | G10L 15/197 704/231 |
| 8,954,329 B2 * | 2/2015 | Labsky | ................... | G10L 15/14 704/260 |
| 2006/0047617 A1 * | 3/2006 | Bacioiu | ................ | G06K 9/6267 706/59 |
| 2008/0126089 A1 * | 5/2008 | Printz | .................... | G10L 15/187 704/235 |
| 2010/0191520 A1 * | 7/2010 | Gruhn | .................. | G06F 3/0237 704/9 |
| 2011/0060587 A1 * | 3/2011 | Phillips | ................... | G10L 15/30 704/235 |
| 2013/0289993 A1 * | 10/2013 | Rao | ......................... | G10L 15/22 704/251 |
| 2014/0095143 A1 * | 4/2014 | Jan | ........................ | G06F 40/163 704/2 |
| 2017/0084271 A1 | 3/2017 | Nakadai et al. | | |
| 2018/0315420 A1 * | 11/2018 | Ash | ........................ | G10L 25/51 |

FOREIGN PATENT DOCUMENTS

| | | |
|---|---|---|
| CN | 104538032 A | 4/2015 |
| CN | 10491526 A | 9/2015 |
| CN | 106959977 A | 7/2017 |

* cited by examiner

METHOD AND APPARATUS FOR CORRECTING INPUT SPEECH BASED ON ARTIFICIAL INTELLIGENCE, AND STORAGE MEDIUM

CROSS REFERENCE TO RELATED APPLICATION

This application is based upon and claims priority to Chinese Patent Application No. 201710909466.7, filed on Sep. 29, 2017, the entire content of which is incorporated herein by reference.

FIELD

The present disclosure relates to a field of language processing, and more particularly to a method for correcting an input speech based on artificial intelligence, an apparatus for correcting an input speech based on artificial intelligence and a storage medium.

BACKGROUND

Artificial intelligence (AI) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The research in this field includes robots, speech recognition, image recognition, natural language processing and expert systems, etc. One of important aspects of AI is the speech recognition.

SUMMARY

A first aspect of embodiments of the present disclosure provides a method for correcting an input speech based on artificial intelligence, including: receiving a speech input by a user; performing recognition on the speech to obtain a current recognition text; obtaining at least one candidate phrase of a first phrase to be corrected in the current recognition text and displaying the at least one candidate phrase to the user; detecting a select operation of the user, the select operation being configured to select one of the at least one candidate phrase as a target candidate phrase; and correcting the first phrase in the current recognition text by using the target candidate phrase, to obtain a target recognition text.

A second aspect of embodiments of the present disclosure provides a computer device, including: a processor and a memory. The processor is configured to operate programs corresponding to executive program codes by reading the executive program codes stored in the memory to implement the method for correcting the input speech based on artificial intelligence described above.

A third aspect of embodiments of the present disclosure provides a non-transitory computer readable storage medium having stored computer programs. The computer programs are configured to be executed by a processor to implement the method for correcting the input speech based on artificial intelligence described above.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Description will be made in detail below to embodiments of the present disclosure. Examples of embodiments are illustrated in the accompanying drawings, in which, the same or similar numbers represent the same or similar elements or elements with the same or similar functions. Embodiments described below with reference to the accompanying drawings are exemplary, which are intended to explain the present disclosure and do not be understood a limitation of the present disclosure.

A method and an apparatus for correcting an input speech based on artificial intelligence provided in embodiments of the present disclosure will be described below with reference to the accompanying drawings.

The speech input technology is simple and easy-to-use and has a higher input speed. Therefore, there is no need for a user to master Hanyu Pinyin (or Hanyu Pinyin Romanization, often abbreviated to pinyin, is the official romanization system for Standard Chinese in mainland China and to some extent in Taiwan) when using the speech input technology, which deeply loved by the user.

Since the speech input technology in the related art does not have an error correction capability, when the recognition text of the speech input by the user does not match with the content of the speech input by the user, the user needs to correct an error in the recognition text manually, which increases an operation period for the user and causes poor user experience.

However, when the user speaks too fast or too light, or since the speech input technology has a decoding problem, it is easy to result in discrepancies between the recognition text and the content that the user wished to input. Since the speech input technology in the related art does not have an error correction capability, when an error exists in the recognition text, the user needs to correct the error manually, which increases an operating period and causes poor user experience.

For the above-mentioned problems, the solution in the related art may correct a recognition result by inputting a speech correction instruction. An operating path of this correction method is longer. The user needs to learn expression of correction instructions with high costs. Moreover, the instruction may be easy to occur a recognition error, which results in that the error is not corrected accurately and seriously influences the user experience.

For the above-mentioned problems, embodiments of the present disclosure provide a method for correcting an input speech based on artificial intelligence, to provide the user with candidate correction items for the error in the recognition text. The user only needs to select the correct one from the candidate correction items and the correcting of the error may be finished, which reduces the operating period for the user, and improves the user experience.

Figure 1:
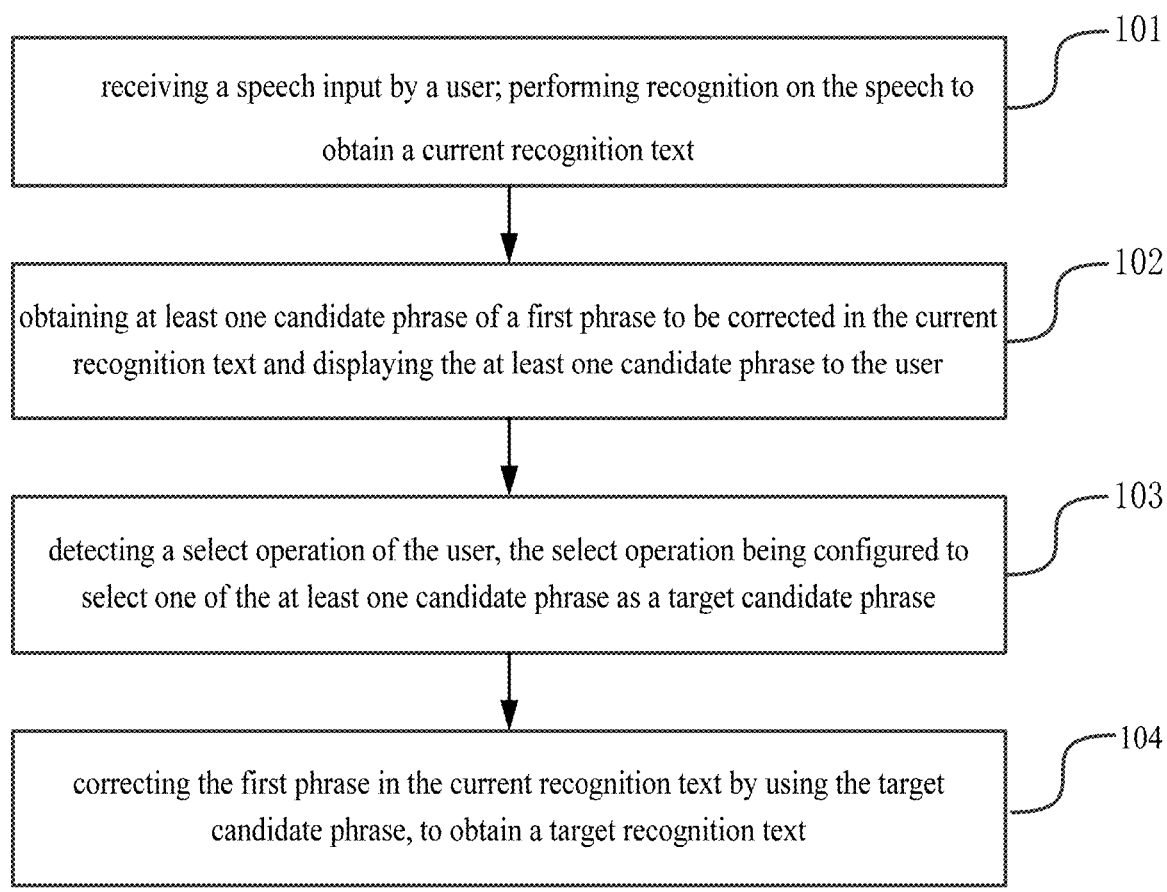
FIG. 1 is a flow chart illustrating a method for correcting an input speech based on artificial intelligence provided in an embodiment of the present disclosure.

FIG. 1 is a flow chart illustrating a method for correcting an input speech based on artificial intelligence provided in an embodiment of the present disclosure. As illustrated in FIG. 1, the method for correcting the input speech based on artificial intelligence includes acts in the following blocks.

In block 101, a speech input by a user is received, and recognition is performed on the speech to obtain a current recognition text.

When the user employs an input method with a speech input function to input the speech, a speech input button in the input method may be triggered to input the speech. After receiving the speech input by the user, the input method may employ the speech recognition technology to recognize the received speech, to obtain the corresponding current recognition text.

Figure 2A:
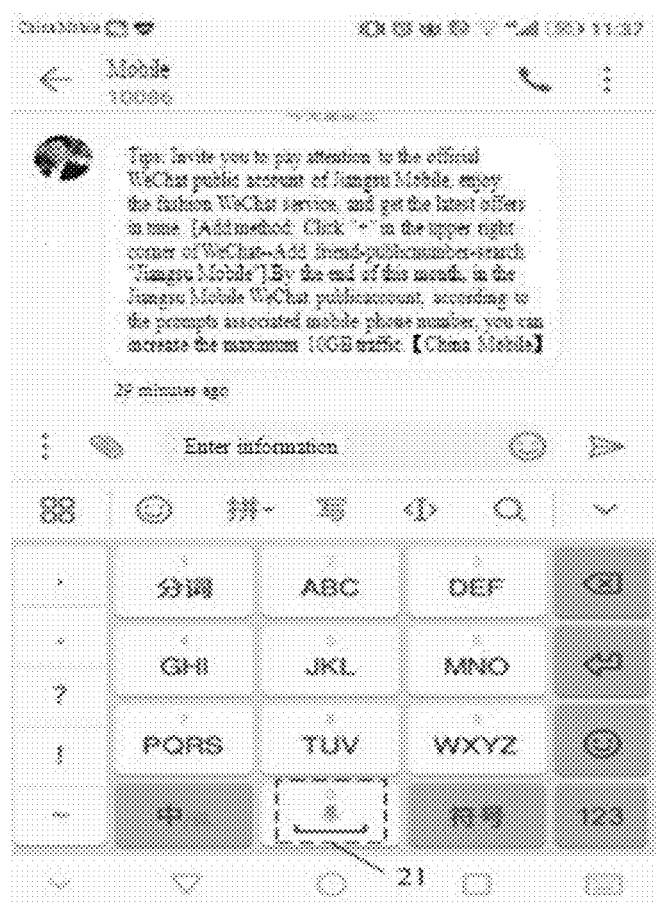
FIG. 2(a) is a schematic diagram illustrating an input surface of BaiDu input method.
Figure 2B:
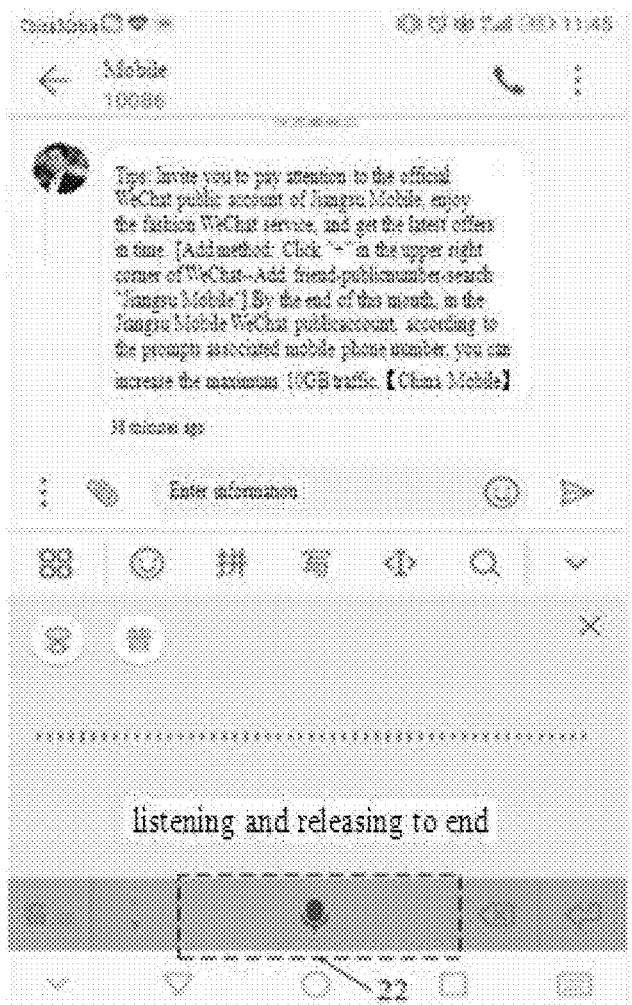
FIG. 2(b) is a schematic diagram illustrating a display surface of BaiDu input method during a speech input process.

Taking BaiDu (i.e., Baidu, Inc., is a Chinese multinational technology company specializing in Internet-related services and products, and artificial intelligence) input method as an example, FIG. 2(a) is a schematic diagram illustrating an input surface of BaiDu input method. As illustrated in FIG. 2(a), a speech input button 21 is provided in the BaiDu input method. The user speaks while long pressing the speech input button 21, such that the speech may be input. In the procedure of inputting the speech by the user, a display surface of the BaiDu input method is as illustrated in FIG. 2 (b). A speech input button 22 in FIG. 2(b) is in a pressed state at this time. In the surface as illustrated in FIG. 2(b), a prompting message "listening and releasing to end" is displayed, to remind the user that the input method is in a state of receiving speech at this time. The user releases the press on the speech input button 22 to finish the input. After receiving the speech input by the user, the input method may obtain the corresponding recognition text by performing recognition on the received speech.

In block 102, at least one candidate phrase of a first phrase to be corrected in the current recognition text is obtained and displayed to the user.

After preforming recognition on the received speech input by the user to obtain the corresponding current recognition text, the input method may further obtain the at least one candidate phrase of the first phrase to be corrected in the current recognition text and display the at least one candidate phrase to the user.

The first phrase is a word or phrase possibly inconsistent with the speech by the user, which is determined by the input method from the current recognition text. Correspondingly, when the first phrase is one word, each of the at least one candidate phrase is also a word; when the first phrase is a phrase, each of the at least one candidate phrase is also a phrase.

After receiving the speech input by the user, the input method recognizes the corresponding current recognition text according to the speech, and finds the first phrase that may be a possible recognition error in the current recognition text, and then determines the at least one candidate phrase corresponding to the first phrase. The input method displays the at least one candidate phrases to the user while displaying the current recognition text to the user.

Figure 3A:
FIG. 3(a) is a schematic diagram illustrating a candidate phrase displayed for a user.

For example, FIG. 3(a) is a schematic diagram illustrating a candidate phrase displayed for a user. As illustrated in FIG. 3(a), the current recognition text recognized by the input method is "开4 四特别耗流量 (Chinese characters, which seem to mean "data flow is consumed particularly when 4g is turned on")", and three candidate phrases "4", "g", and "是 (Chinese character, which means yes and has a similar pronunciation to Chinese character "四")" for Chinese character "四 (which means four)" that may be the error are provided.

Figure 3B:
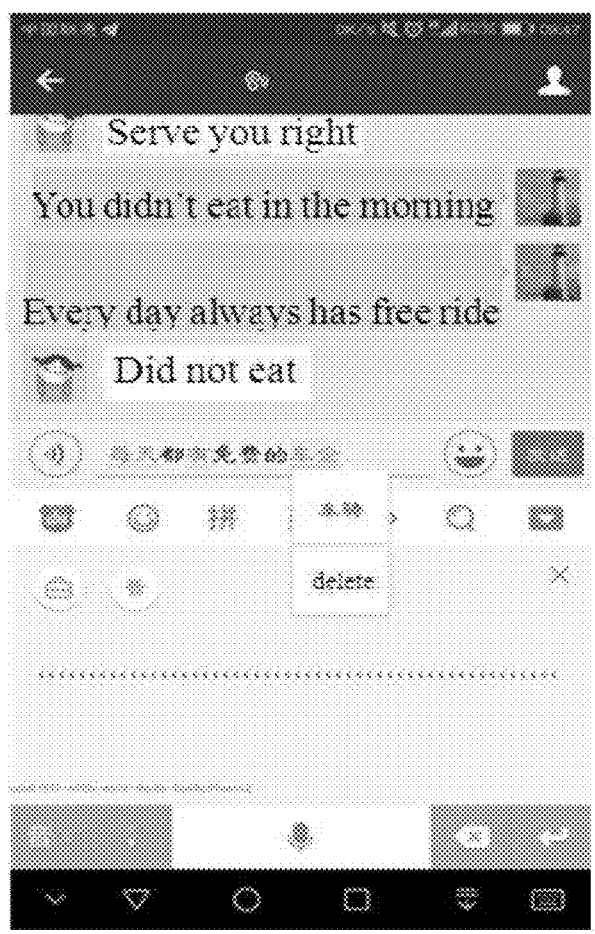
FIG. 3(b) is a schematic diagram illustrating a candidate phrase displayed for a user.

FIG. 3(b) is a schematic diagram illustrating a candidate phrase displayed for a user. As illustrated in FIG. 3(b), the current recognition text recognized by the input method is "每大都有免 费的车企 (Chinese characters, which seem to mean "free car every day")", and a candidate phrase"车骑 (Chinese characters, which mean "car to ride")" for Chinese character "车企 (Chinese characters, which mean "car companies")" that may be the error is provided.

In block 103, a select operation of the user is detected. The select operation is configured to select one of the at least one candidate phrase as a target candidate phrase.

The user views the current recognition text and the at least one candidate phrase displayed in the display surface. When finding that the first phrase displayed in the current recognition text is not consistent with its original meaning, the user may select one of the at least one candidate phrase as the target phrase candidate for the first phrase, to replace the first phrase in the current recognition text with the target candidate phrase.

In block 104, the first phrase in the current recognition text is corrected by using the target candidate phrase, to obtain a target recognition text.

After the user selects the target candidate phrase from the at least one candidate phrase displayed, the input method corrects the first phrase in the current recognition text by using the target candidate phrase, to obtain the target recognition text.

Taking FIG. 3(a) as an example, when the user selects the candidate phrase "g" as the target candidate phrase, the first phrase "四" in the current recognition text "开 4 四特别流量" is replaced with "g', which may obtain the target recognition text "开 4g 特别流量 (Chinese characters, which mean "data flow is consumed particularly when 4g is turned on")".

Figure 3C:
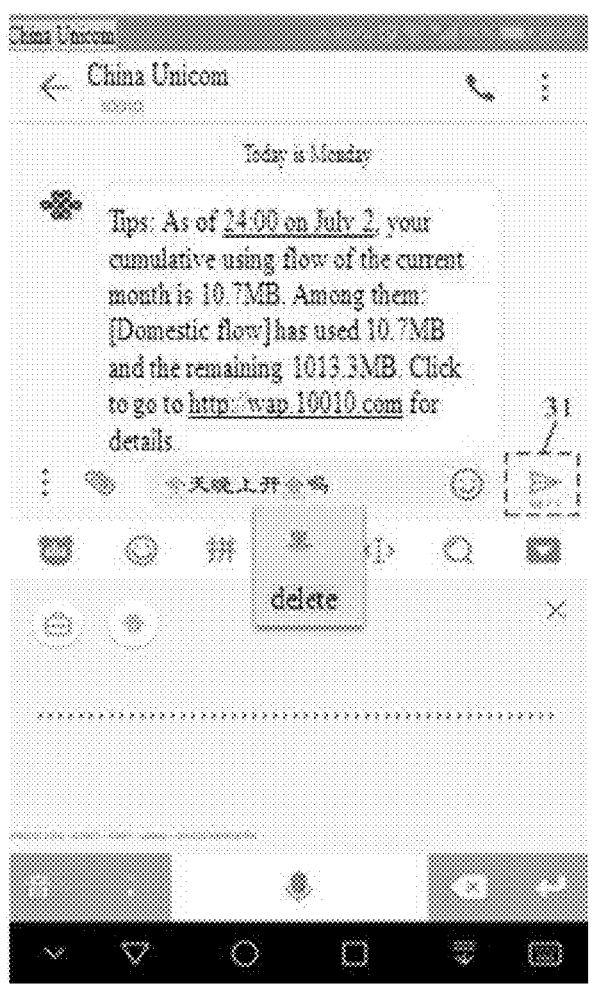
FIG. 3(c) is a schematic diagram illustrating a candidate phrase displayed for a user.

FIG. 3(c) is a schematic diagram illustrating a candidate phrase displayed for a user. As illustrated in FIG. 3(c), the current recognition text recognized by the input method is "今天晚上开 会吗 (Chinese characters, which mean "do you have a meeting this evening?")", and a candidate phrase "黑 (Chinese character, which means black and has a similar pronunciation to Chinese character "会")" for the first phrase "会" that may be the error is provided. When the user determines that the current recognition text is correct, the current recognition text is the target recognition text, and the user may click a sending button 31 to send the recognition text; when the user determines that the current recognition text is false, and thinks that "会" should be replaced with "黑", the user may click to choose "黑" in the candidate phrases, and then the input method replaces "会" in the current recognition text with "黑", to obtain the target recognition text "今天 晚上开黑吗 (Chinese character, which means "is it black this evening?")".

It can be seen from examples illustrated in FIG. 3(a), FIG. 3(b) and FIG. 3(c) that, at the bottom of the at least one of candidate phrase, a "deleting" option is displayed. When the user chooses the "deleting" option, the first phrase corresponding to the at least one of candidate phrase is deleted. Taking FIG. 3 (b) as an example, when the user clicks the "deleting" option, the first phrase "牛伞" will be deleted.

With the method for correcting the input speech based on artificial intelligence provided in embodiments of the present disclosure, the speech input by the user is received. Recognition on the speech is performed to obtain the current recognition text. The at least one candidate phrase of the first phrase to be corrected in the current recognition text is obtained and the at least one candidate phrase is displayed to the user. It is detected that the user selects one of the at least one candidate phrase as the target candidate phrase. The first phrase in the current recognition text is corrected by using the target candidate phrase, to obtain the target recognition text. Therefore, with the method, candidate correction items for a possible error in the recognition result may be automatically provided to the user. The error in the recognition result may be corrected according to one selected from the candidate correction items by the user, to enable the speech input technology to have an error correction capability, which may improve accuracy of the speech input technology and the user experience, and solve a problem that costs a long operating period for the user to manually correct the error in the recognition result in the related art.

Comparing with the related art, with the method, by obtaining at least one candidate phrase of the first phrase to be corrected in the current recognition text and displaying the at least one candidate phrase to the user, the user may select one from the at least one candidate phrase as the target candidate phrase and the first phrase in the recognition text may be corrected by using the target candidate phrase, such that there is no need for the user to input the correct phrase by typing, thereby solving the problem that costs a long operating period for the user to manually correct the error in the recognition result in the related art.

Figure 4:
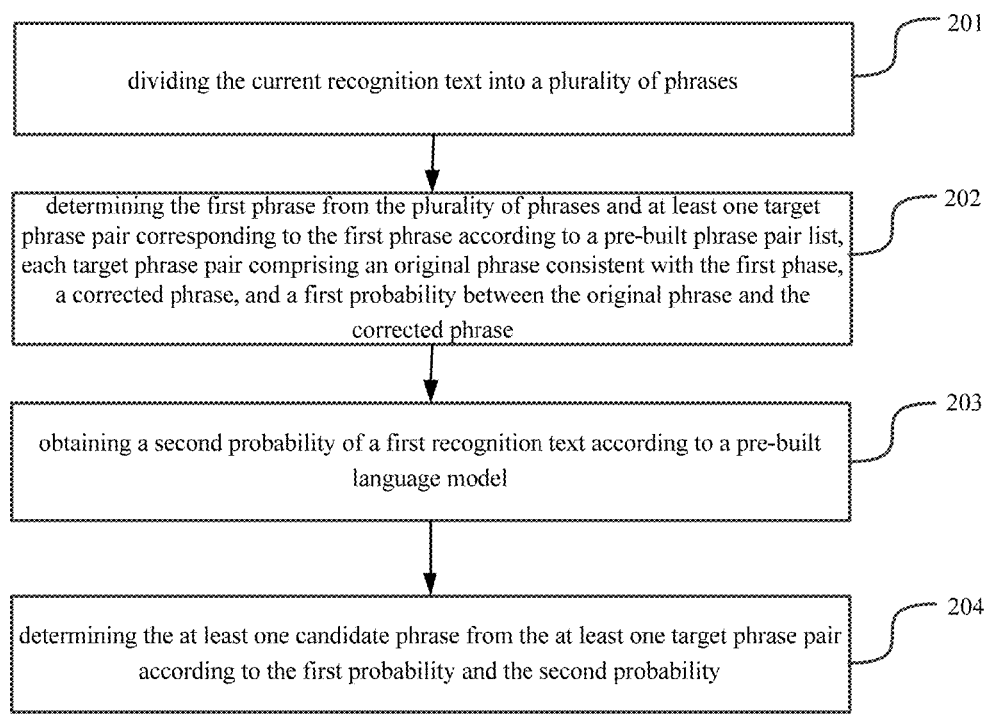
FIG. 4 is a flow chart illustrating a method for correcting an input speech based on artificial intelligence provided in another embodiment of the present disclosure.

To more clearly describe the detailed implementation procedure that obtains the at least one candidate phrase of the first phrase to be corrected in the current recognition text in the above embodiments, embodiments of the present disclosure provide another method for correcting an input speech based on artificial intelligence. FIG. 4 is a flow chart illustrating the method for correcting the input speech based on artificial intelligence provided in another embodiment of the present disclosure.

As illustrated in FIG. 4, based on embodiments illustrated in FIG. 1, obtaining the at least one candidate phrase of the first phrase to be corrected in the current recognition text, described in the block 102, may further be implemented in detailed by acts in the following blocks.

In block 201, the current recognition text is divided into a plurality of phrases.

In embodiments, after the current recognition text is obtained based on the speech input by the user, the input method may divide the current recognition text into the plurality of phrases.

As an example, the plurality of phrases may be obtained by employing the word segmentation technology on the current recognition text. It should be noted herein that, the word segmentation technology is relatively mature in the related art, which is not illustrated in detail herein to avoid redundancy.

In block 202, according to a pre-built phrase pair list, the first phrase is determined from the plurality of phrases and at least one target phrase pair corresponding to the first phrase is determined. Each target phrase pair includes an original phrase consistent with the first phrase, a corrected phrase and a first probability between the original phrase and the corrected phrase.

The first probability is determined according to a number of times that the original phrase appears in a sample corpus and a number of times that the original phrase is corrected into the corrected phrase.

In embodiments, a plurality of corrected paths of the user may be collected as the sample corpus. Each of the corrected paths may include an original recognition text and a corrected recognition text. The original recognition text includes the original phrase. The corrected recognition text includes at least one corrected phrase and the original phrase. After obtaining the corrected paths, the corrected paths are counted and at least one phrase pair is extracted from each path. A phrase pair list is pre-built accordingly. On the procedure of obtaining the phrase pair list, reference is made to the following examples.

After obtaining the phrase pair list, the plurality of phrases is matched with the phrase pair list. The first phrase that may be the error is determined from the plurality of phrases, and at least one target phrase pair corresponding to the first phrase is obtained. The original phrase in the target phrase pair is the first phrase.

In embodiments, in the procedure of counting the phrase pair list, the number of times that the original phrase appears in each phrase pair and the number of times that the same original phrase appears in the sample corpus are counted. The first probability may be calculated based on the two numbers. The phrase pair list includes the original phrase, the corrected phrase and the first probability.

In block 203, a second probability of a first recognition text is obtained according to a pre-built language model.

The first recognition text is obtained by replacing the first phrase in the current recognition text with the corrected phrase in the at least one target phrase pair.

When there are the plurality of the target phrase pairs for the first phrase, to select the target phrase pairs, the target phrase pair that has semantics closer to the current recognition text is selected. The first phrase in the current recognition text may separately be replaced with the corrected phrases in the plurality of the target phrase pairs, to obtain a plurality of the first recognition texts. Further, the first recognition text is input into the pre-built language model, to obtain a second probability of the first recognition text.

As an example, an n-gram language model may be used. A trained n-gram language model is obtained by training. Based on the trained n-gram language model, a score of a sentence input into the trained n-gram language model may be obtained. The n-gram language model may employ any 1-Gram, 2-Gram, 3-Gram, 4-Gram and 5-Gram. Taking 5-Gram as an example, it is assumed that the first recognition text is "今天免费的水 果没有迟到啊 (Chinese characters, which mean "today's free fruit is not late.")", the score (i.e., the second probability) of the first recognition text may be obtained based on 5-Gram language model as follows:

$$P(今天免费的水 果没有迟到啊)=p(今<B>)*$$
$$p(大|<B>今) \ldots p(啊|没有迟到).$$

It should be noted that, the pre-built language model may be separate, or integrated into the phrase pair list as a table function module of the phase pair list. For example, when the phrase pair list is a log linear model, since the log linear model may add sub models conveniently and flexibly, the pre-built language model may be added into the log linear model as a sub model.

In block 204, the at least one candidate phrase is determined from the at least one target phrase pair according to the first probability and the second probability.

As a possible implementation, the first probability and the second probability may be decoded for each target phrase pair, to obtain a third probability corresponding to the target phrase pair, such that the third probabilities corresponding to all target phrase pairs are sorted, and the at least one candidate phrase is selected in order.

There are a plurality of manners of obtaining the third probability based on the first probability and the second probability. In embodiments, the first probability and the second probability may be sent to a decoder. The decoder may employ a dynamic programming decoding algorithm, to obtain an optimum decoding result. The dynamic programming algorithm may be CKY (Cocke-Younger-Kasami algorithm).

In detail, the third probabilities may be sorted in a descending order. When choosing the candidate phrase, the candidate phrases of a preset number may be chosen according to a number of the target phrase pairs. For example, when the number of the target phrase pairs is not greater than three, the corrected phrases included in all target phrase pairs may be chosen as the candidate phrases; when the number of the target phrase pairs is greater than three, the corrected phrases included in the first three target phrases may be chosen as the candidate phrases.

As an example, the log linear model in statistical machine translation is chosen as a machine learning model. The log linear model includes a translation model, a language model, a phonetic model and other features influencing the candidate. Firstly, weights of respective models may be trained based on a smallest error. Further, after training on the log linear model finishes, based on the log linear model, the sample corpus i.e., the corrected paths may be counted to obtain the phrase pair list. After the current recognition text is obtained, the recognition text may be corrected by using the log linear model. A formula of the log linear model is illustrated as a formula (1):

$$\hat{e}_1^I = \arg\max \{Pr(e_1^I | f_1^J)\} = \arg\max \left\{ \sum_{m=1}^{M} \lambda_m h_m(e_1^I | f_1^J) \right\} \quad (1)$$

where, $e_1^I$ represents a target language segment, i.e., a sentence after correcting the recognition text; $f_1^J$ is a given source language segment, i.e., a sentence recognized according to the speech input by the user; $h_m(e_1^I|f_1^J)$ represents a model score of a certain model based on $e_1^I$ and $f_1^J$, and $\lambda_m$ is a weight corresponding to the model score; $Pr(e_1^I|f_1^J)$ is a probability based on $e_1^I$ and $f_1^J$; $\hat{e}_1^I$ represents a preferable target language segment corresponding to the given source language segment.

The current recognition text is divided to obtain a plurality of phrases and the plurality of phrases are respectively input in the above log linear model, which may determine the first phrase that may be the errors, and the at least one candidate phrase of the first phrase.

With the method for correcting the input speech based on artificial intelligence provided in embodiments of the present disclosure, the current recognition text is divided into the plurality of phrases and the first phrase is determined from the plurality of phrases. The corrected phrase corresponding to the first phrase and the first probability is obtained. The second probability of the first recognition text is obtained according to the pre-built language model. The at least one candidate phrase is determined from all target phrase pairs according to the first probability and the second probability. Therefore, a semantic correlation between each of the at least one candidate phrase determined and the current recognition text is higher, and accuracy of the at least one candidate for displaying to the user is improved.

Figure 5:
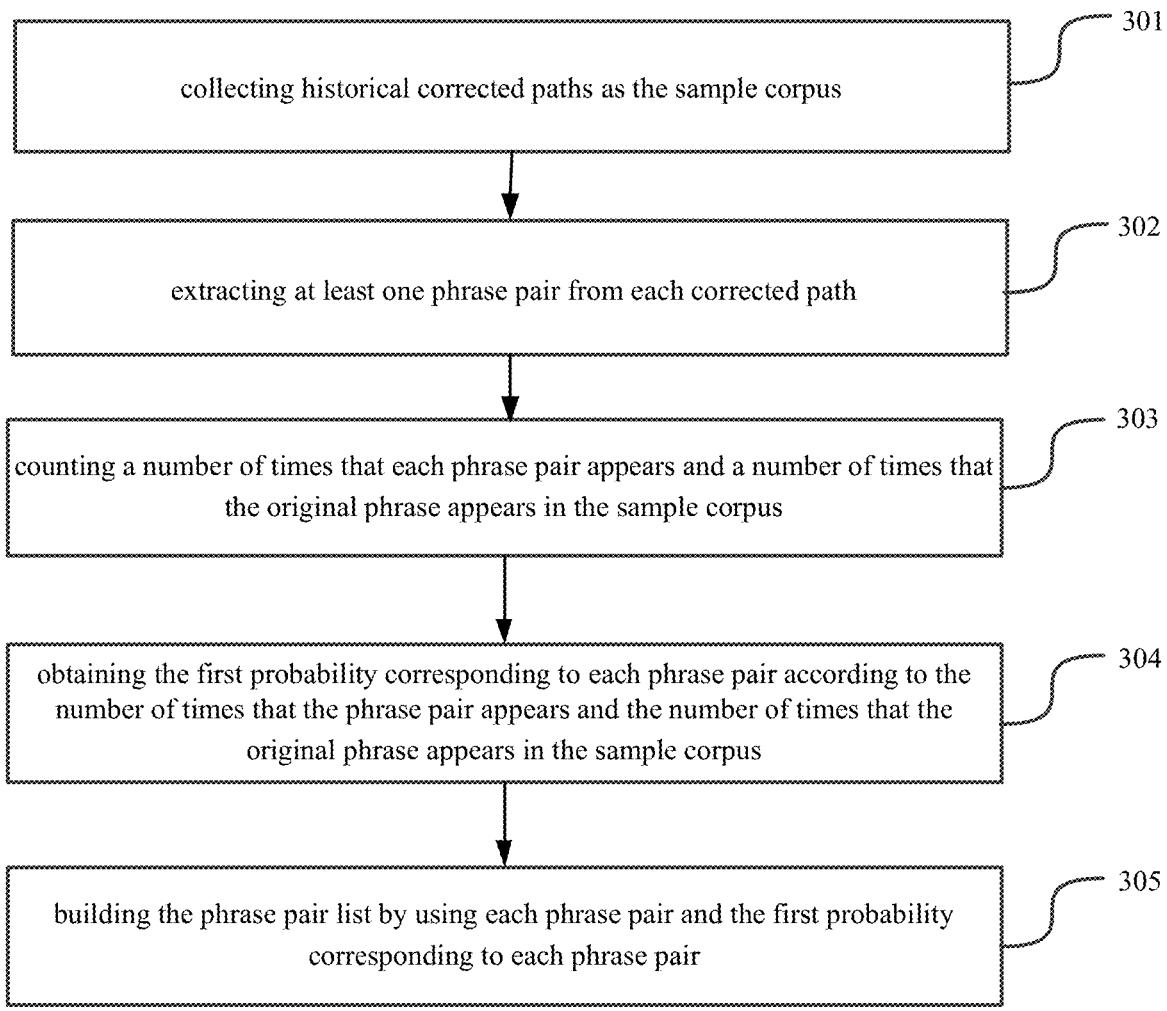
FIG. 5 is a flow chart illustrating a method for correcting an input speech based on artificial intelligence provided in still another embodiment of the present disclosure.

To successfully determine the first phrase by using the pre-built phrase pair list, and obtain the corrected phrase corresponding to the first phrase and the first probability between the first phrase and the corrected phrase, in embodiments of the present disclosure, firstly the phrase pair list needs to be trained. Thus, embodiments of the present disclosure provide another method for correcting an input speech based on artificial intelligence. FIG. 5 is a flow chart illustrating a method for correcting an input speech based on artificial intelligence provided in still another embodiment of the present disclosure.

As illustrated in FIG. 5, based on embodiments illustrated in FIG. 4, before the block 202, the method further includes acts in the following blocks.

In block 301, historical corrected paths are collected as a sample corpus.

Each corrected path includes an original recognition text and a corrected recognition text. The original recognition text includes an original phrase. The corrected recognition text includes at least one corrected phrase and the original phrase.

For example, the original recognition text "今天免费的水果没有迟到啊" and the corrected recognition text "今天免费的水果没有吃到啊 (Chinese characters, which mean "today's free fruit is not eaten.")" constitute a corrected path. "吃" (Chinese character, which means "eat, eating or eaten") is the corrected phrase.

In block 302, at least one phrase pair is extracted from each corrected path.

Each phrase pair includes the original phrase and the corrected phrase corresponding to the original phrase. The original phrase of the at least one original phrase consisting of the original recognition text is corrected to the corrected phrase.

In embodiments, the historical corrected paths may be collected as the sample corpus from a historical input behavior of the user, and/or, the historical corrected paths of all users are collected as the sample corpus, and the at least one phrase pair is extracted from each corrected path.

As an example, when extracting the at least one phrase pair from each corrected path, an extraction algorithm of the phrase pair may be employed. For example, extracting the at least one phrase pair is finished by the algorithm provided by Philipp Koehn and the other people.

For example, when the original recognition text "今天免费的水 果没有迟到啊" and the corrected recognition text "今天免费的水 果没有吃到啊" constitute the corrected path, the phrase pair "迟-吃" may be extracted. When the original recognition text "我看过依 大屠龙记 (Chinese characters, which mean "I have seen Yitian Dragon Slayer.")" and the corrected recognition text "我看过倚天屠龙记 (Chinese characters, which mean "I have seen Eternal Dragon Slayer.")" constitute the corrected path, the phrase pair "依-倚" may be extracted.

It should be noted herein that, the present disclosure mainly solves the problem of speech recognition errors in the input speech, and does not deal with conditions of missing words or multiple words. When extracting the phrase pair, a constraint that should be satisfied is that the length of the original recognition text and the length of the corrected recognition text are the same, thus, the original phrase and the corrected phrase are the same length in the extracted phrase pair.

In block 303, a number of times that each phrase pair appears and a number of times that the original phrase appears in the sample corpus are counted.

In block 304, the first probability corresponding to each phrase pair is obtained according to the number of times that the phrase pair appears and the number of times that the original phrase appears in each corrected path.

In embodiments, after extracting at least one phrase pair from each corrected path, the number of times that each phrase pair appears is counted, and the number of times that the original phrase in the phrase pair appears in the sample corpus is counted. Further, for each phrase pair, a rate of the number of times that the phrase pair appears and the number of times that the original phrase in the phrase pair appears in the sample corpus is calculated, to obtain the first probability corresponding to the phrase pair.

In block 305, a phrase pair list is built by using each phrase pair and the first probability corresponding to each phrase pair.

In embodiments, for each phrase pair, after obtaining the first probability corresponding to the phrase pair, the phrase pair list is built by using each phrase pair and the first probability corresponding to each phrase pair.

Further, to obtain a better phrase pair list, in a possible implementation of embodiments of the present disclosure, a phrase pair which do not meet preset conditions may be culled from all phrase pairs, and then the phrase pair list is constituted by using the remaining phrase pairs and the corresponding first probabilities.

As an example, the phrase pair which do not meet the preset conditions may be culled from all phrase pairs by using a phonetic model. In detail, a first pinyin string of the original phrase and a second pinyin string of the corrected phrase in each phrase pair are obtained. The first pinyin string is compared with the second pinyin string, to obtain a distance between the two pinyin strings. The distance between the two pinyin strings is compared with a preset threshold. When the distance is greater than the preset threshold, the phrase pair is taken as a culling phrase pair, and then the phrase pair list is formed by using the phrase pair other than the culling phrase pair and the first probability corresponding to the phrase pair other than the culling phrase pair.

With the method for correcting the input speech based on artificial intelligence provided in embodiments of the present disclosure, the historical corrected paths are collected as the sample corpus. The phrase pair is extracted from each corrected path. The number of times that each phrase pair appears and the number of times that the original phrase in the phrase pair appears in the sample corpus are counted. The first probability corresponding to each phrase pair is obtained according to the number of times that the phrase pair appears and the number of times that the original phrase in each corrected path appears in the sample corpus. The phrase pair list is built by using each phrase pair and the first probability corresponding to each phrase pair. The method may train and obtain the phrase pair list and form the foundation for determining the first phrase and at least one target phrase pair corresponding to the first phrase according to the phrase pair list.

In embodiments of the present disclosure, the pre-built phrase pair list is a closed-loop model. In one aspect, the first phrase of the current recognition text and the at least one corresponding candidate phrase may be determined by using the phrase pair list. The user may correct the current recognition text according to the candidate phrase displayed, to obtain the target recognition text. In another aspect, the user selects the target candidate phrase from the candidate phrase displayed to correct the first phrase in the current recognition text. In the procedure of obtaining the target recognition text, the input method records the first phrase and the target candidate phrase, to form feedback information, and updates the phrase pair list by using the feedback information.

By constantly collecting the first phrase and the target candidate phrase in the procedure of inputting speech by the user, the phrase pair list is trained to update, which may increase an error correction capability of the input speech constantly over time, and provide more accuracy candidate phrase prediction.

Figure 6:
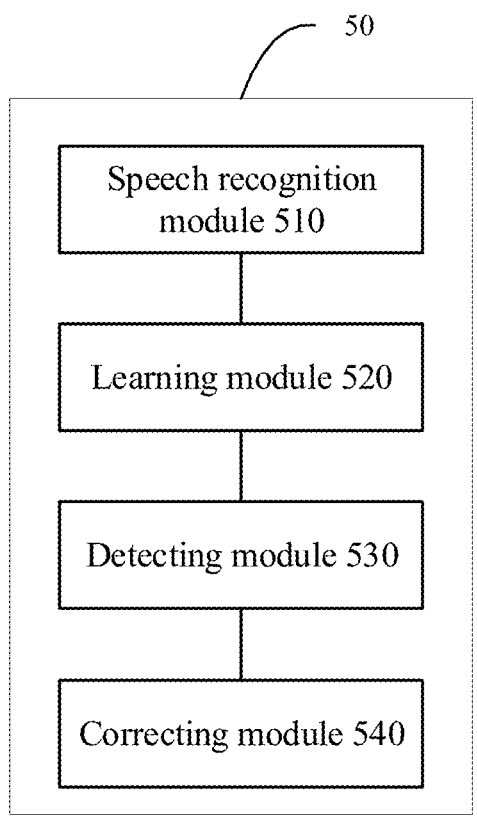
FIG. 6 is a block diagram illustrating an apparatus for correcting an input speech based on artificial intelligence provided in an embodiment of the present disclosure.

To achieve the above embodiments, the present disclosure further provides an apparatus for correcting an input speech based on artificial intelligence. FIG. 6 is a block diagram illustrating the apparatus for correcting the input speech based on artificial intelligence provided in an embodiment of the present disclosure.

As illustrated in FIG. 6, an apparatus 50 for correcting the input speech based on artificial intelligence includes: a speech recognition module 510, a learning module 520, a detecting module 530, and a correcting module 540.

The speech recognition module 510 is configured to perform recognition on a speech input by a user to obtain a current recognition text.

The learning module 520 is configured to obtain at least one candidate phrase of a first phrase to be corrected in the current recognition text and display the at least one candidate phrase to the user.

The detecting module 530 is configured to detect a select operation of the user. The select operation is configured to select one of the at least one candidate phrase as a target candidate phrase.

The correcting module 540 is configured to correct the first phrase in the current recognition text by using the target candidate phrase, to obtain a target recognition text.

Figure 7:
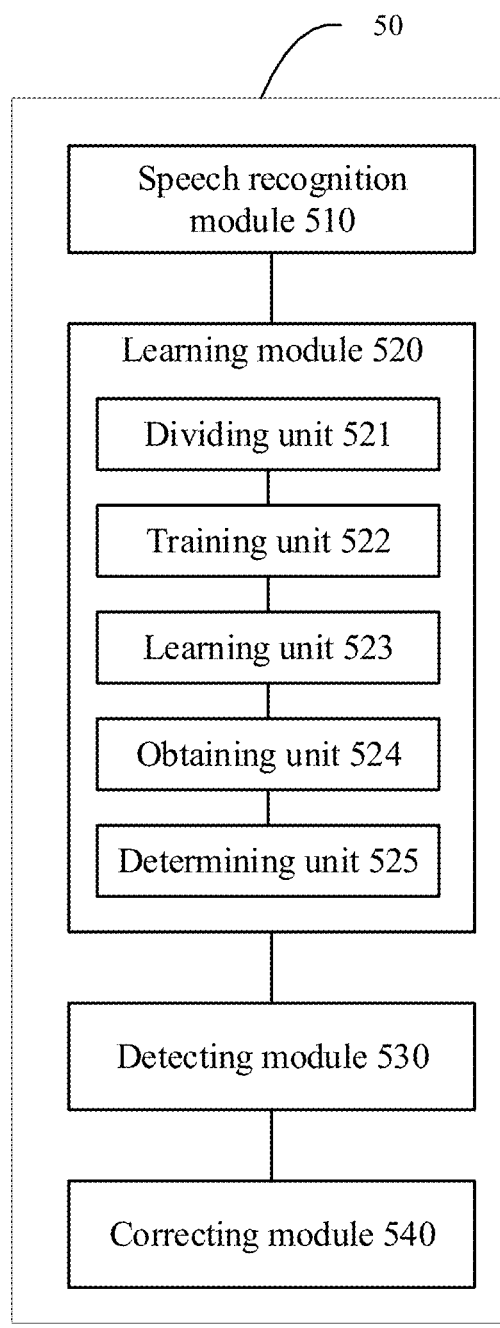
FIG. 7 is a block diagram illustrating an apparatus for correcting an input speech based on artificial intelligence provided in another embodiment of the present disclosure.

Further, in a possible implementation of embodiments of the present disclosure, as illustrated in FIG. 7, based on embodiments illustrated in FIG. 6, the learning module 520 includes a dividing unit 521, a training unit 522, a learning unit 523, an obtaining unit 524 and a determining unit 525.

The dividing unit 521 is configured to divide the current recognition text into a plurality of phrases.

The training unit 522 is configured to: collect historical corrected paths as a simple corpus, in which, each corrected path includes an original recognition text and a corrected recognition text, and the original recognition text includes the original phrase, and the corrected recognition text includes at least one corrected phrase and the original phrase; extract at least one phrase pair from each corrected path; count a number of times that each phrase pair appears and a number of times that the original phrase appears in the sample corpus; obtain the first probability corresponding to each phrase pair according to the number of times that the phrase pair appears and the number of times that the original phrase appears in the sample corpus; and build the phrase pair list by using each phrase pair and the first probability corresponding to each phrase pair.

Further, in order to obtain a better phrase pair list, in a possible implementation of embodiments of the present disclosure, the training unit 522 is configured to build the phrase pair list by using each phrase pair and the first probability corresponding to each phrase pair by acts: obtaining a first pinyin string of the original phrase and a second pinyin string of the corrected phrase in each phrase pair; comparing the first pinyin string with the second pinyin string, to obtain a distance between the two pinyin strings; taking the phrase pair as a culling phrase pair when the distance is greater than a preset threshold; and building the phrase pair list by using the phrase pair other than the culling phrase pair and the first probability corresponding to the phrase pair other than the culling phrase.

The learning unit 523 is configured to determine the first phrase from the plurality of phrases and at least one target phrase pair corresponding to the first phrase according to a pre-built phrase pair list. Each target phrase pair includes an original phrase consistent with the first phase, the corrected phrase, and the first probability between the original phrase and the corrected phrase.

The first probability is determined according to the number of times that the original phrase appears in the sample corpus and the number of times that the original phrase is corrected into the corrected phrase.

The obtaining unit 524 is configured to obtain a second probability of a first recognition text according to a pre-built language model.

The first recognition text is obtained by replacing the first phrase in the current recognition text with the corrected phrase in the at least one target phrase pair.

The determining unit 525 is configured to determine the at least one candidate phrase from the at least one target phrase pair according to the first probability and the second probability.

In detail, the determining unit 525 is configured to: decode the first probability and the second probability for each target phrase pair, to obtain a third probability corresponding to the target phrase pair; sort the third probabilities corresponding to all target phrase pairs, and select the at least one candidate phrase in order.

Figure 8:
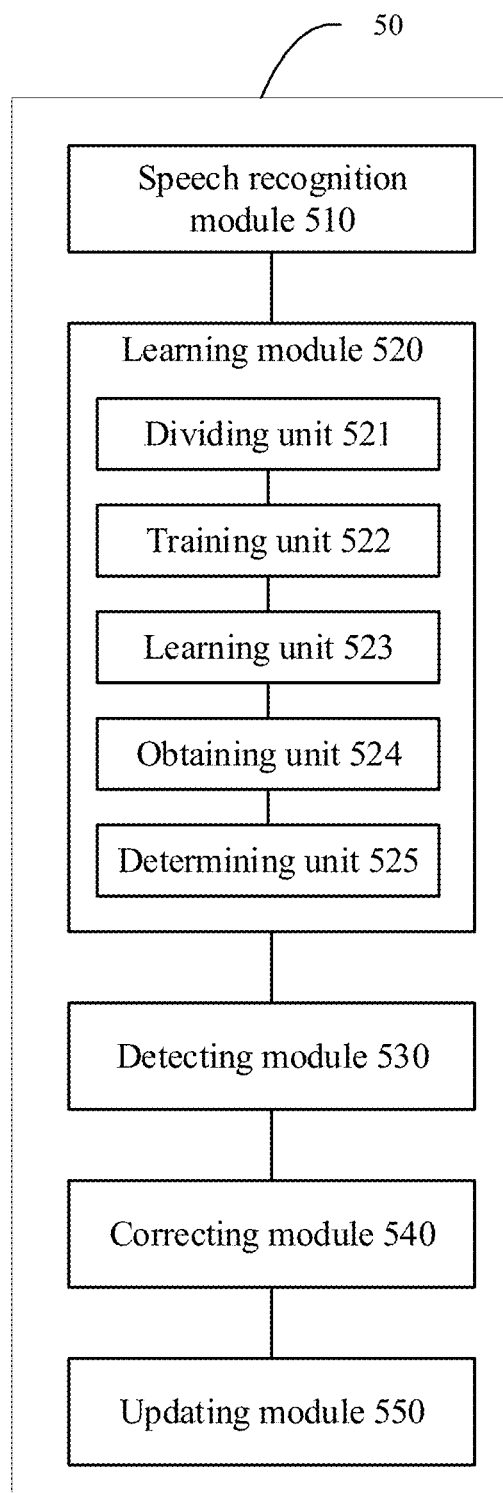
FIG. 8 is a block diagram illustrating an apparatus for correcting an input speech based on artificial intelligence provided in still another embodiment of the present disclosure.

In embodiments of the present disclosure, the pre-built phrase pair list is a closed-loop model. In one aspect, the first phrase of the current recognition text and the at least one corresponding candidate phrase may be determined by using the phrase pair list. The user may correct the current recognition text according to the candidate phrase displayed, to obtain the target recognition text. In another aspect, the user selects the target candidate phrase from the candidate phrase displayed to correct the first phrase in the current recognition text. In the procedure of obtaining the target recognition text, the input method records the first phrase and the target candidate phrase, to form feedback information, and updates the phrase pair list by using the feedback information. Thus, in a possible implementation of embodiments of the present disclosure, as illustrated in FIG. 8, based on embodiments illustrated in FIG. 7, the apparatus 50 for correcting the input speech based on artificial intelligence further includes an updating module 550.

The updating module 550 is configured to record the first phrase and the target candidate phrase, to form feedback information, and update the phrase pair list by using the feedback information.

By constantly collecting the first phrase and the target candidate phrase in the procedure of inputting speech by the user, the phrase pair list is trained to update, which may increase an error correction capability of the input speech constantly over time, and provide more accuracy candidate phrase prediction.

It should be noted that, the foregoing explanation for the method embodiments for collecting the input speech based on artificial intelligence is further suitable for the apparatus for collecting the input speech based on artificial intelligence, and the implementation theory is similar, which is not elaborated herein.

With the apparatus for correcting the input speech based on artificial intelligence provided in embodiments of the present disclosure, the speech input by the user is received. Recognition on the speech is performed to obtain the current recognition text. The at least one candidate phrase of the first phrase to be corrected in the current recognition text is obtained and the at least one candidate phrase is displayed to the user. It is detected that the user select one of the at least one candidate phrase as the target candidate phrase. The first phrase in the current recognition text is corrected by using the target candidate phrase, to obtain the target recognition text. Therefore, with the apparatus, candidate correction items for a possible error in the recognition result may be automatically provided to the user. The error in the recognition result may be corrected according to one selected from the candidate correction items by the user, to enable the speech input technology to have an error correction capability, which may improve accuracy of the speech input technology and the user experience, and solve a problem that costs a long operating period for the user to manually correct the error in the recognition result in the related art. Comparing with the related art, with the apparatus, by obtaining at least one candidate phrase of the first phrase to be corrected in the current recognition text and displaying the at least one candidate phrase to the user, the user may select one from the at least one candidate phrase as the target candidate phrase and the first phrase in the recognition text may be corrected by using the target candidate phrase, such that there is no need for the user to input the correct phrase by typing, thereby solving the problem that costs a long operating period for the user to manually correct the error in the recognition result in the related art.

To achieve the above embodiments, the present disclosure further provides a computer device, including: a processor and a memory. The processor is configured to operate programs corresponding to executive program codes by reading the executive program codes in the memory to implement the method for collecting the input speech based on artificial intelligence as described in the above embodiments.

Figure 9:
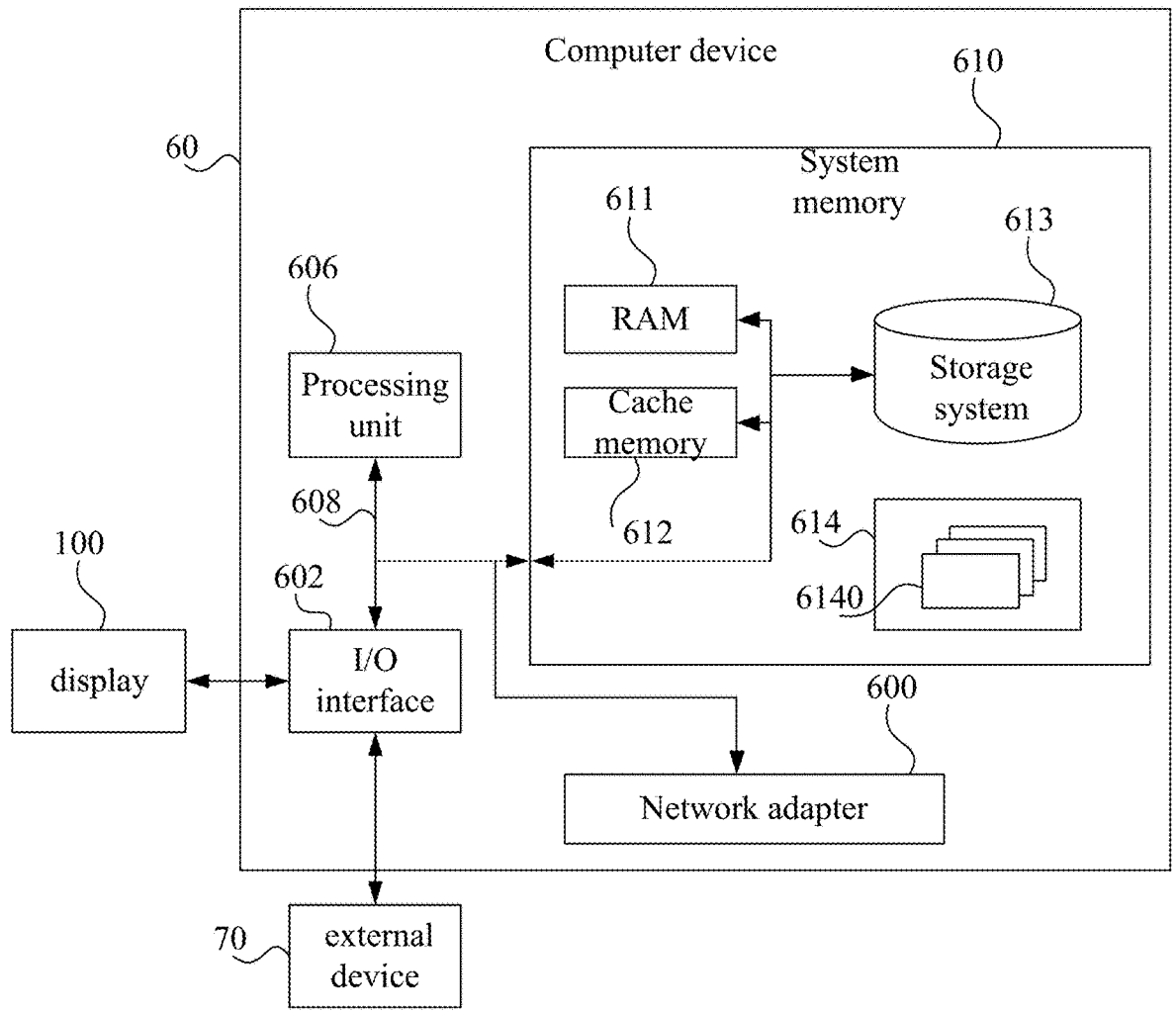
FIG. 9 is a schematic diagram illustrating a computer device provided in an embodiment of the present disclosure.

FIG. 9 is a block diagram illustrating a computer device provided in an embodiment of the present disclosure, which illustrates a diagram of implementing an exemplary computer device 60 suitable for realizing implementations of the present disclosure. The computer device 60 displayed in FIG. 9 is merely an example, which should be not understood to limit the functions and usage scope of embodiments of the present disclosure.

As illustrated in FIG. 9, the computer device 60 may be represented via a general computer device form. The computer device 60 may include but not be limited to the following components: one or more processors or processing units 606, a system memory 610, and a bus 608 connecting various system components (including the system memory 610 and the processing unit 606).

The bus 608 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 60 typically includes a variety of computer system readable media. These media may be any available media accessible by the computer device 60 and includes both volatile and non-volatile media, removable and non-removable media.

The system memory 610 may include a computer system readable medium in the form of volatile memory, such as a random access memory (hereinafter referred to as RAM) 611 and/or a high speed cache memory 612. The computer device 60 may further include other removable or non-removable, volatile or non-volatile computer system storage media. By way of example only, the storage device 613 may be configured to read and write a non-removable and non-volatile magnetic media (not shown in FIG. 9, commonly referred to as a "hard drive"). Although not shown in FIG. 9, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 608 via one or more data medium interfaces. The memory 610 may include at least one program product. The program product has a set (such as, at least one) of program modules configured to perform the functions of various embodiments of the present disclosure.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

A program/utility 614 having a set (at least one) of the program modules 6140 may be stored in, for example, the memory 610. The program modules 6140 include but are not limited to, an operating system, one or more application programs, other programs modules, and program data. Each of these examples, or some combination thereof, may include an implementation of a network environment. The program modules 6140 generally perform the functions and/or methods in the embodiments described herein.

The computer device 60 may also communicate with one or more external devices 70 (such as, a keyboard, a pointing device, a display 100, etc.). Furthermore, the computer device 60 may also communicate with one or more communication devices enabling a user to interact with the computer device 60 and/or other devices (such as a network card, modem, etc.) enabling the computer device 60 to communicate with one or more computer devices. This communication can be performed via the input/output (I/O) interface 602. Also, the computer device 60 may communicate with one or more networks (such as a local area network (hereafter referred to as LAN), a wide area network (hereafter referred to as WAN) and/or a public network such as an Internet) through a network adapter 600. As shown in FIG. 9, the network adapter 600 communicates with other modules of the computer device 60 over the bus 608. It should be understood that, although not shown in FIG. 9, other hardware and/or software modules may be used in connection with the computer device 60. The hardware and/or software includes, but is not limited to, microcode, device drivers, redundant processing units, external disk drive arrays, RAID systems, tap Drive and data backup storage system.

The processing unit 606 is configured to execute various functional applications and data processing by running programs stored in the system memory 610, for example, implementing the method for correcting the input speech based on artificial intelligence as described in the above embodiments.

To achieve the above embodiments, the present disclosure further provides a computer program product. When instructions in the computer program product are executed by a processor, the method for correcting the input speech based on artificial intelligence as described in the above embodiments is implemented.

To achieve the above embodiments, the present disclosure further provides a non-transitory computer readable storage medium having stored computer programs thereon. The computer programs are executed by a processor to implement the method for correcting the input speech based on artificial intelligence as described in the above embodiments.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples can be combined by those skilled in the art.

In addition, the description of "first", "second" is only for description purpose, it cannot be understood as indicating or implying its relative importance or implying the number of indicated technology features. Thus, features defined as "first", "second" may explicitly or implicitly include at least one of the features. In the description of the present disclosure, "a plurality of" means at least two, such as two, three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A computer-implemented method for correcting an input speech based on artificial intelligence, comprising:
   receiving, by one or more computing devices, a speech input by a user;
   performing, by the one or more computing devices, recognition on the speech to obtain a current recognition text;
   obtaining, by the one or more computing devices, at least one candidate phrase of a first phrase to be corrected in the current recognition text and displaying, by the one or more computing devices, the at least one candidate phrase to the user;
   detecting, by the one or more computing devices, a select operation of the user, the select operation being configured to select one of the at least one candidate phrase as a target candidate phrase; and
   correcting, by the one or more computing devices, the first phrase in the current recognition text by using the target candidate phrase, to obtain a target recognition text;
   wherein, obtaining the at least one candidate phrase of the first phrase to be corrected in the current recognition text, comprises:
      dividing, by the one or more computing devices, the current recognition text into a plurality of phrases;
      determining, by the one or more computing devices, the first phrase from the plurality of phrases and at least one target phrase pair corresponding to the first phrase according to a pre-built phrase pair list, each target phrase pair comprising an original phrase consistent with the first phase, a corrected phrase, and a first probability between the original phrase and the corrected phrase, the first probability being determined according to a number of times that the original phrase appears in a sample corpus and a number of times that the original phrase is corrected into the corrected phrase;

obtaining, by the one or more computing devices, a second probability of a first recognition text according to a pre-built language model, the first recognition text being obtained by replacing the first phrase in the current recognition text with the corrected phrase in the at least one target phrase pair; and determining, by the one or more computing devices, the at least one candidate phrase from the at least one target phrase pair according to the first probability and the second probability.

2. The method according to claim 1, wherein, before determining the first phrase from the plurality of phrases and the at least one target phrase pair corresponding to the first phrase according to the pre-built phrase pair list, the method further comprises:

collecting, by the one or more computing devices, historical corrected paths as the sample corpus, each corrected path comprising an original recognition text and a corrected recognition text, the original recognition text comprising the original phrase and the corrected recognition text comprising at least one corrected phrase and the original phrase;

extracting, by the one or more computing devices, at least one phrase pair from each corrected path;

counting, by the one or more computing devices, a number of times that each phrase pair appears and a number of times that the original phrase appears in the sample corpus;

obtaining, by the one or more computing devices, the first probability corresponding to each phrase pair according to the number of times that the phrase pair appears and the number of times that the original phrase appears in the sample corpus; and building, by the one or more computing devices, the phrase pair list by using each phrase pair and the first probability corresponding to each phrase pair.

3. The method according to claim 2, wherein, building the phrase pair list by using each phrase pair and the first probability corresponding to each phrase pair, comprises:

obtaining, by the one or more computing devices, a first pinyin string of the original phrase and a second pinyin string of the corrected phrase in each phrase pair;

comparing, by the one or more computing devices, the first pinyin string with the second pinyin string, to obtain a distance between the two pinyin strings;

taking, by the one or more computing devices, the phrase pair as a culling phrase pair when the distance is greater than a preset threshold; and building, by the one or more computing devices, the phrase pair list by using the phrase pair other than the culling phrase pair and the first probability corresponding to the phrase pair other than the culling phrase.

4. The method according to claim 1, wherein, determining the at least one candidate phrase from the at least one target phrase pair according to the first probability and the second probability, comprises:

decoding, by the one or more computing devices, the first probability and the second probability for each target phrase pair, to obtain a third probability corresponding to the target phrase pair;

sorting, by the one or more computing devices, the third probabilities corresponding to all target phrase pairs, and selecting the at least one candidate phrase in order.

5. The method according to claim 2, wherein, after correcting the first phrase in the current recognition text by using the target candidate phrase to obtain the target recognition text, the method further comprises:

recording, by the one or more computing devices, the first phrase and the target candidate phrase, to form feedback information;

updating, by the one or more computing devices, the phrase pair list by using the feedback information.

6. A computer device, comprising a processor and a memory; wherein the processor is configured to operate programs corresponding to executive program codes by reading the executive program codes stored in the memory to implement a method comprising:

receiving a speech input by a user;

performing recognition on the speech to obtain a current recognition text;

obtaining at least one candidate phrase of a first phrase to be corrected in the current recognition text and displaying the at least one candidate phrase to the user;

detecting a select operation of the user, the select operation being configured to select one of the at least one candidate phrase as a target candidate phrase; and correcting the first phrase in the current recognition text by using the target candidate phrase, to obtain a target recognition text;

wherein, obtaining the at least one candidate phrase of the first phrase to be corrected in the current recognition text, comprises:

dividing the current recognition text into a plurality of phrases;

determining the first phrase from the plurality of phrases and at least one target phrase pair corresponding to the first phrase according to a pre-built phrase pair list, each target phrase pair comprising an original phrase consistent with the first phase, a corrected phrase, and a first probability between the original phrase and the corrected phrase, the first probability being determined according to a number of times that the original phrase appears in a sample corpus and a number of times that the original phrase is corrected into the corrected phrase;

obtaining a second probability of a first recognition text according to a pre-built language model, the first recognition text being obtained by replacing the first phrase in the current recognition text with the corrected phrase in the at least one target phrase pair; and determining the at least one candidate phrase from the at least one target phrase pair according to the first probability and the second probability.

7. The computer device according to claim 6, wherein, before determining the first phrase from the plurality of phrases and the at least one target phrase pair corresponding to the first phrase according to the pre-built phrase pair list, the method further comprises:

collecting historical corrected paths as the sample corpus, each corrected path comprising an original recognition text and a corrected recognition text, the original recognition text comprising the original phrase and the corrected recognition text comprising at least one corrected phrase and the original phrase;

extracting at least one phrase pair from each corrected path;

counting a number of times that each phrase pair appears and a number of times that the original phrase appears in the sample corpus;

obtaining the first probability corresponding to each phrase pair according to the number of times that the phrase pair appears and the number of times that the original phrase appears in the sample corpus; and building the phrase pair list by using each phrase pair and the first probability corresponding to each phrase pair.

8. The computer device according to claim 7, wherein, building the phrase pair list by using each phrase pair and the first probability corresponding to each phrase pair, comprises:

obtaining a first pinyin string of the original phrase and a second pinyin string of the corrected phrase in each phrase pair;

comparing the first pinyin string with the second pinyin string, to obtain a distance between the two pinyin strings;

taking the phrase pair as a culling phrase pair when the distance is greater than a preset threshold; and building the phrase pair list by using the phrase pair other than the culling phrase pair and the first probability corresponding to the phrase pair other than the culling phrase.

9. The computer device according to claim 6, wherein, determining the at least one candidate phrase from the at least one target phrase pair according to the first probability and the second probability, comprises:

decoding the first probability and the second probability for each target phrase pair, to obtain a third probability corresponding to the target phrase pair;

sorting the third probabilities corresponding to all target phrase pairs, and selecting the at least one candidate phrase in order.

10. The computer device according to claim 7, wherein, after correcting the first phrase in the current recognition text by using the target candidate phrase to obtain the target recognition text, the method further comprises:

recording the first phrase and the target candidate phrase, to form feedback information;

updating the phrase pair list by using the feedback information.

11. A non-transitory computer readable storage medium having stored computer programs thereon, wherein, the computer programs are executed by a processor to implement a method comprising:

receiving a speech input by a user;

performing recognition on the speech to obtain a current recognition text;

obtaining at least one candidate phrase of a first phrase to be corrected in the current recognition text and displaying the at least one candidate phrase to the user;

detecting a select operation of the user, the select operation being configured to select one of the at least one candidate phrase as a target candidate phrase; and correcting the first phrase in the current recognition text by using the target candidate phrase, to obtain a target recognition text;

wherein, obtaining the at least one candidate phrase of the first phrase to be corrected in the current recognition text, comprises:

dividing the current recognition text into a plurality of phrases;

determining the first phrase from the plurality of phrases and at least one target phrase pair corresponding to the first phrase according to a pre-built phrase pair list, each target phrase pair comprising an original phrase consistent with the first phase, a corrected phrase, and a first probability between the original phrase and the corrected phrase, the first probability being determined according to a number of times that the original phrase appears in a sample corpus and a number of times that the original phrase is corrected into the corrected phrase;

obtaining a second probability of a first recognition text according to a pre-built language model, the first recognition text being obtained by replacing the first phrase in the current recognition text with the corrected phrase in the at least one target phrase pair; and determining the at least one candidate phrase from the at least one target phrase pair according to the first probability and the second probability.

12. The storage medium according to claim 11, wherein, before determining the first phrase from the plurality of phrases and the at least one target phrase pair corresponding to the first phrase according to the pre-built phrase pair list, the method further comprises:

collecting historical corrected paths as the sample corpus, each corrected path comprising an original recognition text and a corrected recognition text, the original recognition text comprising the original phrase and the corrected recognition text comprising at least one corrected phrase and the original phrase;

extracting at least one phrase pair from each corrected path;

counting a number of times that each phrase pair appears and a number of times that the original phrase appears in the sample corpus;

obtaining the first probability corresponding to each phrase pair according to the number of times that the phrase pair appears and the number of times that the original phrase appears in the sample corpus; and building the phrase pair list by using each phrase pair and the first probability corresponding to each phrase pair.

13. The storage medium according to claim 12, wherein, building the phrase pair list by using each phrase pair and the first probability corresponding to each phrase pair, comprises:

obtaining a first pinyin string of the original phrase and a second pinyin string of the corrected phrase in each phrase pair;

comparing the first pinyin string with the second pinyin string, to obtain a distance between the two pinyin strings;

taking the phrase pair as a culling phrase pair when the distance is greater than a preset threshold; and building the phrase pair list by using the phrase pair other than the culling phrase pair and the first probability corresponding to the phrase pair other than the culling phrase.

14. The storage medium according to claim 11, wherein, determining the at least one candidate phrase from the at least one target phrase pair according to the first probability and the second probability, comprises:

decoding the first probability and the second probability for each target phrase pair, to obtain a third probability corresponding to the target phrase pair;

sorting the third probabilities corresponding to all target phrase pairs, and selecting the at least one candidate phrase in order.

15. The storage medium according to claim 12, wherein, after correcting the first phrase in the current recognition text by using the target candidate phrase to obtain the target recognition text, the method further comprises:

recording the first phrase and the target candidate phrase, to form feedback information;

updating the phrase pair list by using the feedback information.

* * * * *